United States Patent [19]  [11] 4,165,397
Ogden et al. [45] Aug. 21, 1979

[54] REPAIR OF GLASS LAMINATES

[75] Inventors: P. H. Ogden; H. Pennicott, both of Harlow, England

[73] Assignee: Minnesota Mining and Manufacturing Company, St. Paul, Minn.

[21] Appl. No.: 613,522

[22] Filed: Sep. 15, 1975

[30] Foreign Application Priority Data

Sep. 27, 1974 [GB] United Kingdom ............... 42117/74
Apr. 18, 1975 [GB] United Kingdom ............... 16166/75

[51] Int. Cl.² ............................................. B32B 35/00
[52] U.S. Cl. ...................................... 427/140; 156/94; 264/36; 427/163; 427/294; 428/63
[58] Field of Search ............... 427/140, 163, 165, 294, 427/299, 307, 309; 156/94, 98; 264/36, 102; 428/63

[56] References Cited

U.S. PATENT DOCUMENTS

| 3,562,366 | 2/1971 | Sohl | 264/36 X |
| 3,765,975 | 10/1973 | Holingsworth | 156/94 |
| 3,841,932 | 10/1974 | Forler et al. | 156/94 |
| 3,914,145 | 10/1975 | Forler et al. | 156/98 |

Primary Examiner—George F. Lesmes
Assistant Examiner—Bruce H. Hess
Attorney, Agent, or Firm—Cruzan Alexander; Donald M. Sell; Mark A. Litman

[57] ABSTRACT

Repair of bulls-eye mark damage to laminated glass is effected by subjecting the area of the crack to reduced air pressure of at most 0.5 mm Hg for 10 minutes, application of a low viscosity, liquid, curable composition, increase in the air pressure, and cure of the resin composition to a transparent polymer.

8 Claims, 1 Drawing Figure

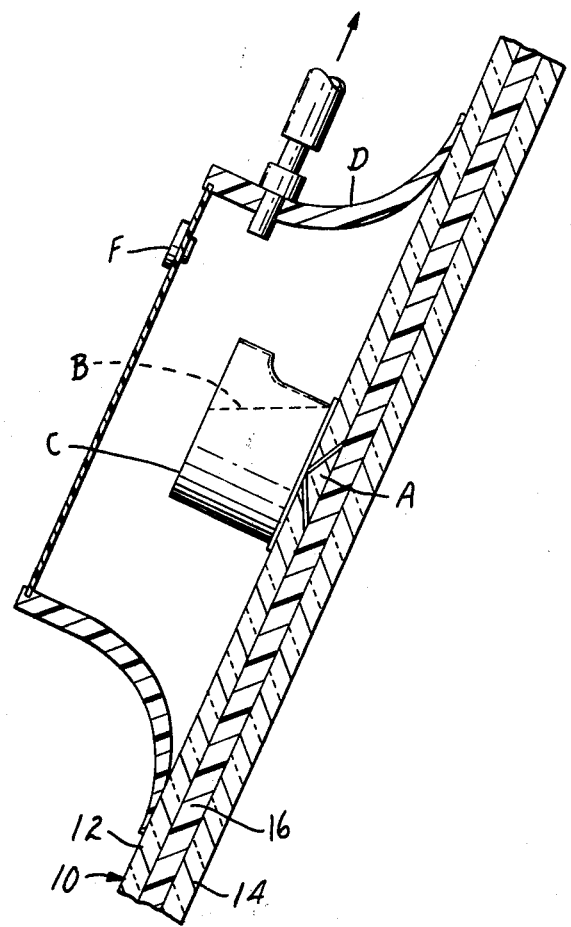

REPAIR OF GLASS LAMINATES

This invention relates to the repair of laminated glass of which vehicle windshields and windows are prime examples.

When laminated windshields are impacted by small stones, or the like, thrown up from the road by other vehicles, circular "bulls-eye" marks are formed. While this type of damage is less dangerous than complete crazing of a toughened windshield, such bulls-eye marks can distort vision and weaken the strength of the glass. Replacement of a windshield is expensive and can result in poor sealing and subsequent leakage during wet weather.

Bulls-eye marks are formed by the dislodging of a piece of glass in the shape of a cone and whose apex is at the point of impact from one of the laminated sheets of glass. Although this conical shaped piece of glass is held in place by the other pane of the laminate and the intermediate plastic layer, the refraction of light at the resulting air/glass interface in the gap between the displaced piece of glass and the remainder of the pane gives a circular diffusing area referred to as a "bulls-eye mark." There may also be some other crack damage such as cracks which radiate out from the bulls-eye mark.

It is therefore an object of this invention to provide a simple method of repairing such bulls-eye marks and other crack damage so that the repair is rendered substantially invisible.

According to the invention there is provided a method of repairing crack damage to a glass laminate in which the region of the laminate surface containing the crack or cracks is subjected to a reduced pressure of no greater than about 0.5 mm Hg for at least 10 minutes to remove air from the crack or cracks, a low viscosity, liquid, curable resin composition is applied to the laminate surface over the crack or cracks and the reduced pressure removed, the curable resin composition being allowed to penetrate into the crack or cracks, the curable resin composition is allowed to cure to a transparent polymer whose refractive index is sufficiently close to that of the glass to give a visibly non-obvious repair, and excess cured resin is removed.

We have found that in this way it is possible with the minimum of skill and ancillary equipment to repair damage such as bulls-eye marks in glass laminates. Also any other crack damage such as cracks radiating from the bulls-eye damage can be filled and repaired so that further crack propagation does not occur, provided, of course, that the reduced pressure is applied to cover the total area of any such radiating cracks and the curable resin composition is applied to cover such radiating cracks. Also vehicle windshields can be repaired relatively cheaply in place, which is a significant advantage compared with replacement. Furthermore, the forces applied to the windshield during repair are not large, being at most 1 atmosphere spread over a reasonable area and so the chances of increasing the damage to the windshield and making it irreparable, e.g. by fracturing pieces of glass from around the bulls-eye damage, are negligible compared with processes where very large mechanical and hydraulic forces are applied to separate the cone from the remainder of the glass so as to assist in filling the void.

The curable resin composition should have a low viscosity so as to be capable of entering the crack once atmospheric pressure is restored. Capillary action also assists in drawing the composition into the crack. This can be enhanced by appropriate choice of components of the curable composition. Additionally one can include in the composition some volatile solvent, e.g. a ketone such as acetone, which will evaporate away once the composition has penetrated the crack but which will provide the required initial low viscosity. It appears to be desirable that the viscosity of the compositions be as low as possible since this assists in penetration and filling the crack. This is in contrast to prior processes for reparing laminated glass where low viscosity is reported to have the disadvantage that the composition might run away from the crack before filling it because the previous methods suggested for causing penetration gave much slower penetration of the crack.

The cured polymer mass should be transparent since if it is appreciably translucent or opaque the mend will be obvious. Some coloration of the polymerized mass is tolerable since the quantity of material present in the crack is very small and so the degree of light absorption by it is usually negligible.

So that the repaired crack is not visually obvious, the refractive index of the cured polymer should be close to that of the glass. The refractive indices of different types of glass vary and so the refractive index of the polymerized mass resulting from a composition of the invention must be so chosen that a reasonable match with the glass to be repaired is obtained.

Figures for refractive indices are as measured in sodium yellow light and vary slightly with the wave-length of the light so for the sake of convenience herein all references to a refractive index will be measured in sodium yellow light. Because of this variation of the refractive index with wave-length, an exact match of refractive index of the glass and polymerized mass can only be obtained at one wave-length, an excellent match over the range of visible wave-lengths can be, however, made with the preferred compositions of the invention made from curable epoxides because their change of refractive index with wave-length is about the same as that of glass.

The refractive indices of the various types of glass fall into fairly narrow ranges. Thus, soda glasses of the type used in manufacturing laminated glass windshields and windows have a refractive index in the range of 1.513 to 1.527 and so the compositions of the invention, once cured and in place in the crack, should have a refractive index in or close to this region.

Naturally, the closer the two refractive indices the better, but because of slight variations in batches of glass it is not usually practical to match the indices exactly in every case although by appropriate adjustment of the composition it is possible to make an almost exact match in a specific case.

The refractive index of the polymerized mass should be close to that of the glass once polymerization of the mass in the crack is substantially complete since the refractive index of the polymerizable composition may change slightly during polymerization and the value within the crack may be different from the value in bulk. By experience we have found that this value can be extrapolated from the refractive index of the uncured resin composition.

Many methods are available to measure the refractive index of the polymerized mass. One suitable method is to immerse the mass in a succession of clear colorless liquids whose known refractive indices form an increasing series. The refractive index of the mass is then that of the liquid in which it becomes least visible. However, the most direct and simple test to establish whether a particular composition is suitable is to test it directly by mending a crack in that type of glass to see whether the crack is visible. This can be a very accurate test since the eye is very sensitive to localized differences in refractive index.

The polymerizable mass preferably polymerizes to a fairly rigid material giving a good chemical bond to both sides of the crack. The sides of the crack are unlikely to be dirty because of the small dimensions of the crack but the crack surfaces may have absorbed gases and a good chemical bond must be achieved in the presence of these absorbed molecules. Adhesive compositions which remain tacky are not desired for use according to the invention.

During polymerization the mass must not expand or contract appreciably thus opening up and propagating the crack and leaving voids which would make the repair readily visible.

To avoid the presence of voids in the repaired crack no gaseous products can be tolerated during polymerization.

The polymerizable composition can be a monomer, a pre-polymer or a mixture of monomers and/or pre-polymers whose polymerization is catalysed by a suitable catalyst or by actinic radiation such as ultra violet light. It is preferred, however, that the polymerizable composition be one which is self curing, i.e. a mixture of a monomer and/or pre-polymer and a curing agent since, as the widths of cracks are usually small, it is important that most if not substantially all of the molecules present in the crack be present for some essential purpose. Often the compositions of the invention will be a blend of two or more monomers and/or pre-polymers. In this way while no single monomer or pre-polymer will produce a polymer which has the necessary refractive index and other properties, the blended composition will give, upon polymerization, the required properties.

The curable or polymerizable resin composition must be liquid so that it can penetrate into a crack and fill it. One factor which appears to assist penetration is the ability of the composition to wet the glass. Thus the composition should wet the glass surface if efficient penetration and bonding is to occur.

Besides atmospheric pressure, there will be a strong capillary action drawing the composition into and filling the crack. The surface tension of compositions of the invention, which affects this capillary force, does not appear to be too critical because the capillary force is usually very high and not a limiting factor except with very wide cracks. A typical value for a composition of the invention is, however, 38 dynes/cm.

There does not appear to be a significant lower limit on viscosity which a composition of the invention must possess and so it appears that the lower the viscosity the better the penetration of the composition into the crack is likely to be. The viscosity of the composition can be reduced by incorporating solvents in the composition. In the case of readily volatile solvents, such as acetone, these will evaporate away from the composition during and after its cure and so they must not be present in such an amount that their evaporation leaves voids which are visible or reduce the overall strength of the polymerized mass or its bond to the glass. However, it appears that the presence of limited amounts of solvents may in fact cause the composition to polymerize to a higher degree of cure than in the absence of the solvent (see for example Handbook of Epoxy Resins by Lee and Neville, Chapter 13, page 132). The optimum amount of solvent for a particular polymerizable composition can be found by experimentation and in the case of acetone it is found that epoxy polymerizable compositions containing about 8% by weight of acetone give desirable viscosity values for the composition and an excellent cured mass.

The rate of polymerization should not be too rapid since otherwise the useful working life of the composition will be too short, and equally the rate of heat production during polymerization must not be excessive otherwise so much heat may be given out during polymerization within the crack that further cracking or crack propagation may occur. It appears that a commercially acceptable composition should remain useable for several hours. The compositions of the invention must, however, polymerize sufficiently quickly to give a repair reasonably quickly at the ambient glass temperature so that a car or other vehicle windshield can be repaired without undue loss of service to the vehicle. Since vehicles need servicing from time to time repairs can be made then and polymerization needs to be sufficiently complete within such a service period for excess polymerized material to be removed from the glass surface to restore a good surface to the laminate.

Many epoxides together with a suitable curing agent such as an amine are suitable for use as the polymerizable composition. By suitable blending mixtures of these epoxides one can obtain exactly the required refractive index for the polymerized mass, and suitable viscosity properties for the compositions. Epoxides are found to give a good bond to clean glass surfaces and therefore they are very suitable for use in compositions according to the invention. In general, when using epoxides we prefer to use a mixture of two monomers whose individual refractive indices are such that the cured mass resulting from the mixture has values of these parameters as required for the purposes of this invention.

We have found that vastly improved bonding of the polymerized mass to the walls of the crack can be achieved if the polymerizable compositions of the invention include a compound containing active silane groups since such groupings readily react with the glass crack surfaces and also assist in the penetration of the compositions into the crack. It appears that compositions which contain a high proportion of active silane groups provide greater strenght to a repaired crack. An active silane group is one which can be hydrolysed by water or other hydroxyl group containing compound to give a silanol. This can then be condensed with the -OH groups available on the glass surface to form a chemical bond.

The active silane groups can be present on one of the components of the polymerizable composition or can be present on a component which becomes incorporated into the polymerized mass during polymerization. It is preferred, however, that these groups be present on one of the components of the polymerizable composition since as noted above it is preferable for the composition to contain the minimum number of components.

In the case of a polymerizable composition based on an epoxide and a curing agent such as an amine, the active silane groups can be present on the amine curing agent and/or on the epoxide monomer.

For example, the curing agent can be an amine of the following general formula:

$H_2N-(CH_2)_p-[HN(CH_2)_m-Si[OR]_yR_z$ in which R represents an alkyl, and preferably a lower alkyl group, p is an integer from 1 to 10, n is a small integer, m is 0 or an integer from 1 to 5, y is 1, 2, or 3 and z is 0, 1 or 2 such that the sum of y and z is 3, and examples of such amines are $H_2N-(CH_2)_3-Si-(OCH_3)_3$ and $H_2N-(CH_2)_2-NH-(CH_2)_3-Si-(OCH_3)_3$.

To improve the bond to the glass surface it is desirable that the polymerizable composition contain a relatively large number of active silane groups. Accordingly, we prefer to use an epoxide monomer which contains active silane groups, e.g. one having the general formula:

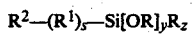
$R^2-(R^1)_s-Si[OR]_yR_z$ in which R, y and z are as defined above and $R^1$ represents a divalent alkenyl chain the carbon chain of which may be interrupted by oxygen atoms forming an ether link, s is 0 or 1, and $R^2$ represents an epoxy group, i.e. $-CH-CH_2$, or an alicyclic ring having an epoxy group substituent, e.g.

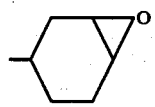

and an example of such a monomer is

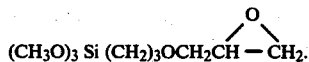
$(CH_3O)_3Si(CH_2)_3OCH_2CH-CH_2$.

Another suitable curable composition is that which uses an unsaturated polyester resin, e.g. a copolymer of polyethylene glycol maleate blended with methylmethacrylate or other diluent to obtain the required viscosity and refractive index. Such a composition can also contain one or more components having active silane groups. Thus the unsaturated polymerizable monomer can have the general formula:

$R^3(R^2)_tSi[OR]_yR_z$ in which R, y and z are as defined above, t is 0 to 1, $R^2$ represents a carboxylic acid linking moiety having the general formula:

$-C(O)O(CH_2)_s-$ or $-OC(O)(CH_2)_s-$ s is a small integer, $R^3$ represents $-CH^4=CH_2$ and $R^4$ represents a hydrogen atom or a linear alkyl group, e.g. a methyl group.

Examples of such monomers are vinyl trimethoxysilane and $CH_2=C(CH_3)C(O)O(CH_2)_3Si(OCH_3)_3$.

Another compound which acts in a similar way is:

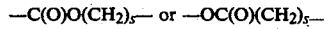
$CH_2-CH-Si[-O-O-C(CH_3)_3]_3$.

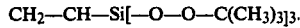

These unsaturated polyester compositions can be polymerized by free radical initiators or by ultra violet light, i.e. as present in bright sunlight.

The polymerized mass should have good weathering properties and it appears that to achieve this, stoichiometric proportions of the components of the polymerizable mixture should be chosen to ensure substantially complete polymerization. Also an accelerator can be added to the compositions, e.g. triphenyl phosphite, in which case improved water resistance is also obtained.

It appears that to have good weathering properties the polymerized compositions of the invention when in a crack should exhibit a low degree of swelling when in contact with water. This low degree of swelling is required so that strength is not impaired, any changes of refractive index are minimal, significant stress are not applied to the repaired region. The degree of swelling of a cured composition is related to its water absorption which can be readily tested by immersing samples of cured composition in water and other compositions for periods of time and noting their weight increase. Preferred compositions exhibit a weight increase when tested in this way of less than 1.5% after immersion in water for 1 week and less than 2.5% after immersion in water for 1 month, with comparable values when immersed in 5% aqueous solution of ammonia or alcohol.

Also the polymerized mass should be substantially unaffected by atmospheric ultra violet light that is to say ultra violet light of the wavelength and intensity which exists naturally upon exposure to sunlight. In this connection it is important that the polymerized mass must not degrade upon exposure to an extent which will seriously weaken the bond between the glass crack surfaces or give noticible yellowings. To avoid this the composition of the invention can include one of the well known ultra violet light absorbers such as 2,1-dihydroxy-benzophenone, 2-hydroxy-1-methoxy-benzophenone, 2,2'-dihydroxyl-4-4'-dimethoxy-benzophenone, 2,2'-dihydroxy-4-methoxy-benzophenone, 2,2',4,4'-tetrahydroxy-benzophenone, phenyl salicylate, 1-butylphenyl-salicylate, 5-chloro-2-hydroxy-benzophenone, dibenzoylresorcinol, 2,2'-dihydroxy-5-methylphenolbenzotriozole or 2,2'-dihydroxy-4-octyloxy-benzophenone.

Because the polymerizable composition must polymerize at ambient temperatures, i.e. the temperature of the glass laminate being repaired, it must be sold in a non-reactable form. Thus it can be sold as two separate components which are mixed shortly before use. The composition can therefore, for example, be sold in any of the conventional two component packs used to store components separately until it is intended that they react. Such a pack can be a single plastic sachet divided into two by a rupturable membrane which separates the two components until the composition is to be used whereupon the membrane is ruptured, the two components mixed within the sachet and then the sachet opened and the mixed composition used.

It appears that to ensure a high chance of successful filling a crack, a high vacuum must be applied for sufficient time. It is believed that this is necessary because the very small width dimensions of the cracks results in a relatively slow rate of escape of air molecules from the crack. To achieve good success at filling cracks it seems that the vacuum applied must be at least as low as 0.5 mm Hg and that this low pressure must be applied for at least 10 minutes and preferably 30 minutes, the longer the time the better. Also the lower the pressure the greater the chances of a successful repair or the shorter the time required for application of the vacuum. Thus with a pressure of only 0.1 mm Hg the range of times of its application can be reduced to about 5 to 15 minutes; pressures as low as 0.1 0.1 mm Hg are however somewhat more difficult and expensive to obtain than about 0.5 mm Hg which are possible with normal vacuum pumps and vacuum lines and so in many cases a slightly longer time of application of the slightly higher pressure may be preferred to a lower pressure.

The region of damage can be subjected to the reduced pressure by means of a cup-shaped member with a resilient lip which can provide a temporary seal with the laminate surface this member being placed on the laminate surface and then air sucked out from within the cup. A high vacuum should be created within this cup so as to draw as much air as possible from the crack. This may take some time as noted above. It is not however a difficult problem to create a high vacuum since vacuum pumps are not particularly expensive to buy or sophisticated in operation.

In order to retain the low viscosity liquid over the damaged area a small open-topped reservoir can be formed over at least the point of entry to the damaged area and desirably over all radiating cracks by sticking to the laminate surface a small open-topped pocket shaped member having an open side in contact with the laminate, then once the high vacuum has been established, the low viscosity liquid is placed into the reservoir and the subsequent release of vacuum and capillary action force the composition into the cracks to fill them. The composition can be placed in the reservoir by injection through an injectable portion of the cup-shaped member.

Once the low viscosity liquid is in place in the reservoir the vacuum can be released and the cup-shaped member removed.

The reservoir is then left in place until such a time as penetration of the resin into the damaged area by capillary action is complete. During this time the vehicle need not be completely immobile and can be subjected to other servicing.

After penetration and preferably after cure is effected, the pocket-shaped receptacle forming the open-topped reservoir is removed from the windshield, excess resin scraped off and the pock mark cleaned and polished, e.g. by buffing with metal polish.

The invention will now be illustrated by the following example together with the accompanying diagrammatic drawing which is a cross-section through a damaged laminated windshield.

The FIGURE shows a laminated windshield 10 consisting of two panes of glass 12 and 14 with a plastic sandwiched layer 16. A bulls-eye damage mark is shown with a dislodged conical piece A from the pane 12. There may also be cracks in the pane 12 (not shown) radiating out from the center of the cone.

The repair is made by stkcing a polyethylene pocket-shaped receptacle C about 15 mm diameter and 10 mm deep over the "bulls-eye" crack in such a position as to cover the "bulls-eye" entry point and all other cracks. The resulting reservoir, which is constructed with an opening in the top for receiving resin, is held in place by the application of a small quantity of a rapid curing epoxy adhesive.

A vacuum cup D is then placed over the reservoir, care being taken to ensure complete covering of any cracks radiating out from the "bulls-eye" so as to avoid air leakage. The region within the cup is then evacuated to a pressure of approximately 0.5 mm Hg at which figure it is maintained for approximately 30 minutes.

A low viscosity resin B is injected through the injection point F in the vacuum cup into the reservoir until the reservoir is filled, whereupon the vacuum is released and the vacuum cup D removed.

Resin flows immediately into the crack. Although complete filling may take several hours it is usually possible to remove the receptacle C from the glass after 2 hours, together with excess resin. A razor blade is found to be quite suitable for this purpose.

After the injected resin has cured, the small hole remaining at the initial point of impact, i.e. the tip of the cone, is filled with a suitable resin which can be polished after cure so that it matches the surrounding glass surface.

A formulation which is suitable for filling the crack is as follows (all parts being by weight):

Epikote 828 (a liquid diglycidyl) ether of bisphenol A available from Shell and having an epoxide equivalent of 190, an average molecular weight of 370 and a viscosity at 25° C. of 125cP) . . . 18 parts, Epikote 871 (an aliphatic polyepoxide available from Shell and having an epoxide equivalent of 390 to 470 and a viscosity at 25° C. of 400 to 900 cP) . . . 20 parts, vinyl-functional silane [(CH$_3$)$_3$COO$_3$]Si CH=CH$_2$ (that sold by Dow Corning under the trade name Z-6075) . . . 14 parts, vinyl cyclohexane dioxide (sold by Union Carbide Company under the name ERL 4206) . . . 2 parts, Synolide 960 (a polyamide curing agent for epoxy resins sold by Cray Valley Products Limited, having an amine value of 350 mg KOH/g and a viscosity at 25° C. of 200 to 400 cP) . . . 18 parts, diethylene triamine . . . 1 part, and acetone . . . 8 parts.

The above formulation, immediately after mixing, possesses a viscosity of 30 cP.

What we claim is:

1. A method of repairing crack damage to a glass laminate which comprises subjecting the region of the laminate surface containing the crack to a reduced pressure of no greater than 0.5 mm Hg for at least 10 minutes to remove air from the crack, applying a low viscosity, liquid, curable resin composition to the laminate surface over the crack, removing the reduced pressure and curing the curable resin composition to a transparent polymer whose refractive index is sufficiently close to that of the glass to give a visibly non-obvious repair.

2. A method as claimed in claim 1 in which the curable resin composition comprises a blend of at least two curable monomers and/or pre-polymers.

3. A method as claimed in claim 1 which includes at least one curable epoxide and a curing agent therefore.

4. A method as claimed in claim 1 in which the curable resin composition applied to the laminate surface includes a volatile solvent in an amount insufficient to leave visible voids in the repair after evaporation of the solvent and curing of the composition.

5. A method as claimed in claim 1 in which at least one component in the curable resin composition has an active silane group.

6. A method as claimed in claim 1 in which the reduced pressure is applied for at least 30 minutes.

7. A method as claimed in claim 1 in which an open-topped reservoir is formed over the region of the laminate surface containing the crack by sticking an open-topped pocketshaped member to the surface of the laminate, the resin composition being added to this reservoir after application of the reduced pressure, and the pocket-shaped member being removed from the surface of the laminate after the removal of the reduced pressure.

8. A method as claimed in claim 1 wherein excess cured resin is removed.

* * * * *